Patented Apr. 25, 1939

2,156,039

UNITED STATES PATENT OFFICE 2,156,039

PROCESS OF CHLORINATING METHANE AND THE HOMOLOGUES THEREOF

Karl Dachlauer, Hofheim-on-the-Taunus, and Erwin Schnitzler, Frankfort-on-the-Main-Hochst, Germany, assignors to I. G. Farbenindustrie Aktiengesellschaft, Frankfort-on-the-Main, Germany No Drawing. Application January 23, 1937, Serial No. 122,084. In Germany January 28, 1936

5 Claims. (Cl. 260—662)

This invention relates to a process of chlorinating methane and the homologues thereof, it being possible by calculating the quantity of chlorine to be introduced to obtain a good yield of low-chlorinated hydrocarbons without the formation of decomposition products.

We have found that methane and the low homologues thereof such as ethane, propane and the like may be chlorinated in a surprisingly simple manner and with a special effect as regards the composition of the products of the chlorination according to the following process:

A mixture of the hydrocarbon to be chlorinated and chlorine is heated to a high temperature which, however, is below that which induces chlorination, and is passed at a high velocity through a thin layer of a porous substance or through a fine-meshed tissue of a suitable material. On this permeable contact-plane a spontaneous chlorination of the hydrocarbon occurs which is characterized by a vigorous rise of temperature within the contact. The velocity of chlorination which for instance in case of methane, at a temperature between 400° C. and 450° C. and in an otherwise empty space is relatively small, increases many times in the contacts so that notwithstanding the high rate of flow and the low pre-heating temperature of the mixture of hydrocarbon and chlorine, the chlorination occurs in the small contact layer and the gases are practically free from chlorine when they leave the contact.

The temperature to which the gases should be pre-heated in order that the chlorination may occur completely within the contact, chiefly depends on the hydrocarbon to be chlorinated, the concentration of the chlorine in the mixture of gases and the constitution of the contact.

As suitable contact masses there may be used quartz, glass, chamotte, pumice stone, asbestos, graphite, coke and the like; in the form of thin porous plates, as are applied for instance as filter plates, or in the form of a thin layer of fine grains or in the form of fine-meshed tissues in one or more layers. Metals the chlorides of which are sparingly volatile, especially nickel, may likewise be used in the form of gauze. By impregnating the contact layers with sparingly volatile metal chlorides the action of the contacts may be enhanced.

When operating as described the formation of decomposition products, especially of soot may be avoided and the formation of low-chlorinated hydrocarbons is considerably favored. The particularly high velocity of chlorination is a special advantage for industrial purposes since it permits the use of a chlorination apparatus essentially smaller and more simple than apparatus formerly used.

In the following Example 1 relates to a product prepared according to the method hitherto known, whereas Example 2 illustrates the preparation of the same product according to the present invention, Example 3 illustrates another reaction according to this invention:

1. A current of mixture of 148 liters of methane and 37 liters of chlorine (4 vols. to 1 vol.) is passed per hour through an empty glass tube of an inside diameter of 50 millimeters and a length of 800 millimeters which is heated to 400° C. The products of the chlorination are separated by cooling to a low temperature the gases leaving the tube which are practically free from chlorine (when larger quantities of the mixture are passed per hour the reaction of the chlorine is incomplete); the mixture of the products of chlorination has the following composition: 48.5 per cent. of $CH_3Cl$, 36.9 per cent. of $CH_2Cl_2$, 12.7 per cent. of $CHCl_3$, 1.9 per cent. of $CCl_4$.

2. A porous quartz filter plate of a thickness of 10 millimeters is arranged in a glass tube of a length of 500 millimeters and an inside diameter of 50 millimeters so that the length on one side of the contact plate is 390 millimeters; this length is used as the pre-heating zone; there remains a space 100 millimeters long on the other side of the contact. Now first methane (300 liters per hour) is passed through the glass tube while the pre-heating zone is kept at about 400° C. by external heating. Then gaseous chlorine is added to the methane and its quantity is gradually raised (to 75 liters per hour). During this operation the temperature in the pre-heating zone is decreased to about 250° C. pari passu with the addition of chlorine the temperature at the contact finally increases to 450° C. to 480° C. If the temperature of the mixture of methane and chlorine is now constantly kept constant at about 250° C., the temperature directly behind the contact adjusts itself to 450° C. to 480° C. and the gases of the reaction leave the contact practically free from chlorine. The composition of the products of the chlorination obtainable according to Example 1 is as follows: 60.3 per cent. of $CH_3Cl$, 32.5 per cent. of $CH_2Cl_2$, 5.5 per cent. of $CHCl_3$, 1.7 per cent. of $CCl_4$. This example shows that in spite of a considerable diminution of the dimensions of the apparatus, the quantity of the mixture passed per hour has essentially been raised. Moreover the formation of higher-chlorinated products has diminished in favor of the low-chlorinated products.

Instead of a quartz filter plate several layers of a fine-meshed screen of nickel wire, the total thickness being 3 millimeters to 4 millimeters may be used with nearly the same effect.

3. In order to chlorinate propane in the apparatus described in Example 2 a current of a mixture of 200 liters of propane and 60 liters of chlorine per hour is pre-heated to 220° C. to 240° C. and passed through the contact. The temperature at the contact adjusts itself to 350° C. to 370° C. The mixture of the products of the chlorination has the following composition:

75.2 per cent. of normal propyl chloride and isopropylchloride, 21.1 per cent. of dichloropropane (boiling at a temperature up to about 100° C.), 3.7 per cent. of higher chlorinated products.

We claim:

1. A process of chlorinating an aliphatic hydrocarbon of the group consisting of methane, ethane and propane which comprises pre-heating together the hydrocarbon to be chlorinated and the chlorine to a temperature between 220° C. and about 400° C. passing the pre-heated mixture of gases with a high velocity through a thin permeable layer of the group consisting of porous substances and fine-meshed screens the material of said layer being resistant to chlorine and hydrogen chloride at the reaction temperature and separating the chlorination products formed.

2. A process of chlorinating an aliphatic hydrocarbon of the group consisting of methane, ethane and propane which comprises pre-heating together the hydrocarbon to be chlorinated and the chlorine to a temperature between 220° C. and about 400° C. passing the pre-heated mixture of gases with a high velocity through a thin permeable layer of the group consisting of porous substances and fine-meshed screens the material of said layer being resistant to chlorine and hydrogen chloride at the reaction temperature and separating the chlorination products formed by cooling to a low temperature.

3. The process which comprises the step of passing a mixture of chlorine with an aliphatic hydrocarbon of the group consisting of methane, ethane and propane at a temperature between 350° C. and 480° C. through a thin permeable layer of the group consisting of porous substances and fine-meshed screens the material of said layer being resistant to chlorine and hydrogen chloride at the reaction temperatures.

4. The process which comprises the steps of pre-heating a mixture containing 4 volumes of methane and 1 volume of chlorine at a temperature between about 250° C. and about 400° C., passing the pre-heated mixture of gases through a porous quartz filter plate at a temperature between 450° C. and 480° C. and isolating the chlorination products formed.

5. The process which comprises the steps of pre-heating a mixture containing 10 volumes of propane and 3 volumes of chlorine at a temperature between 220° C. and 240° C., passing the pre-heated mixture of gases through a porous quartz filter plate at a temperature between 350° C. and 370° C. and isolating the chlorination products formed.

KARL DACHLAUER.
ERWIN SCHNITZLER.